Patented Jan. 10, 1928.

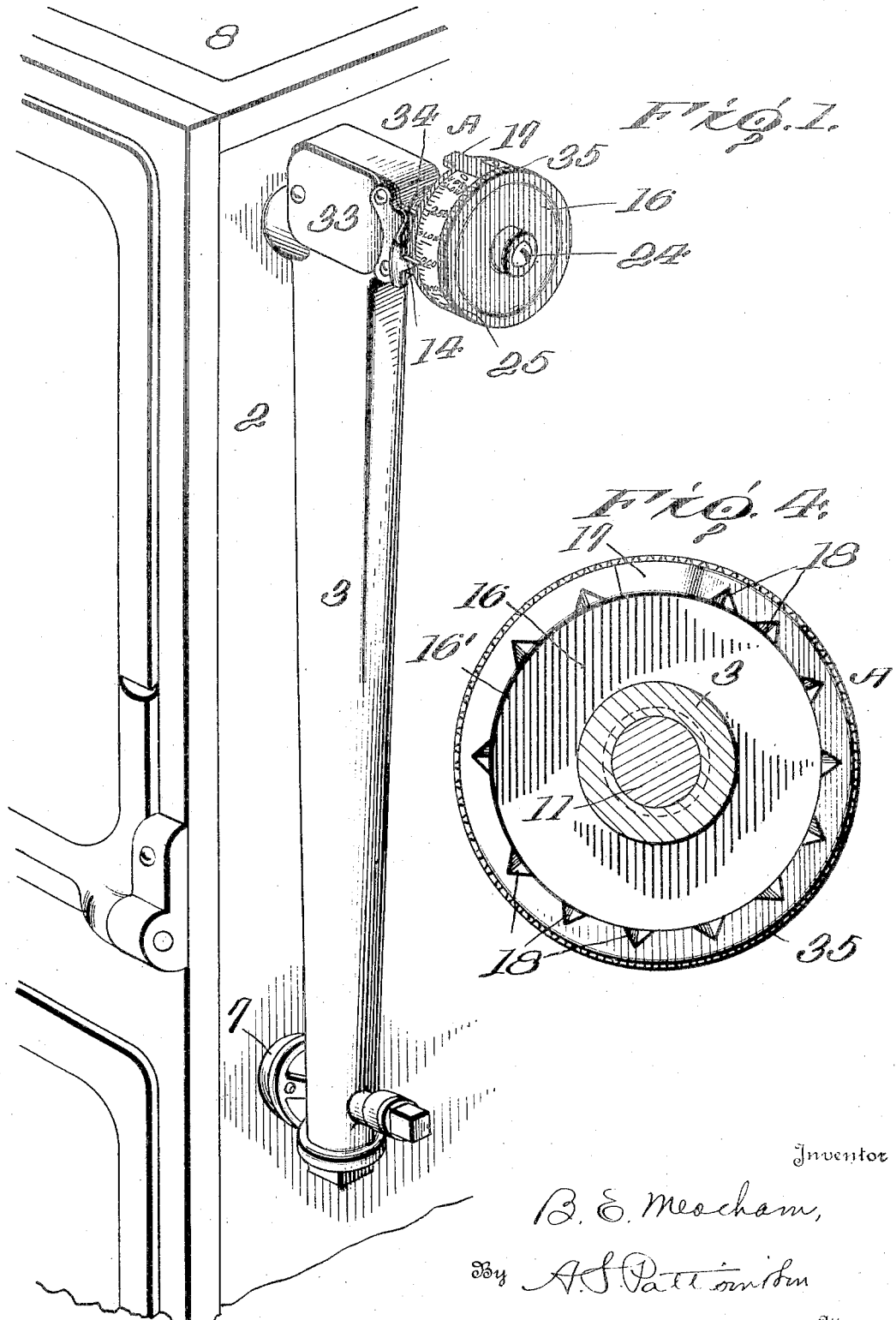

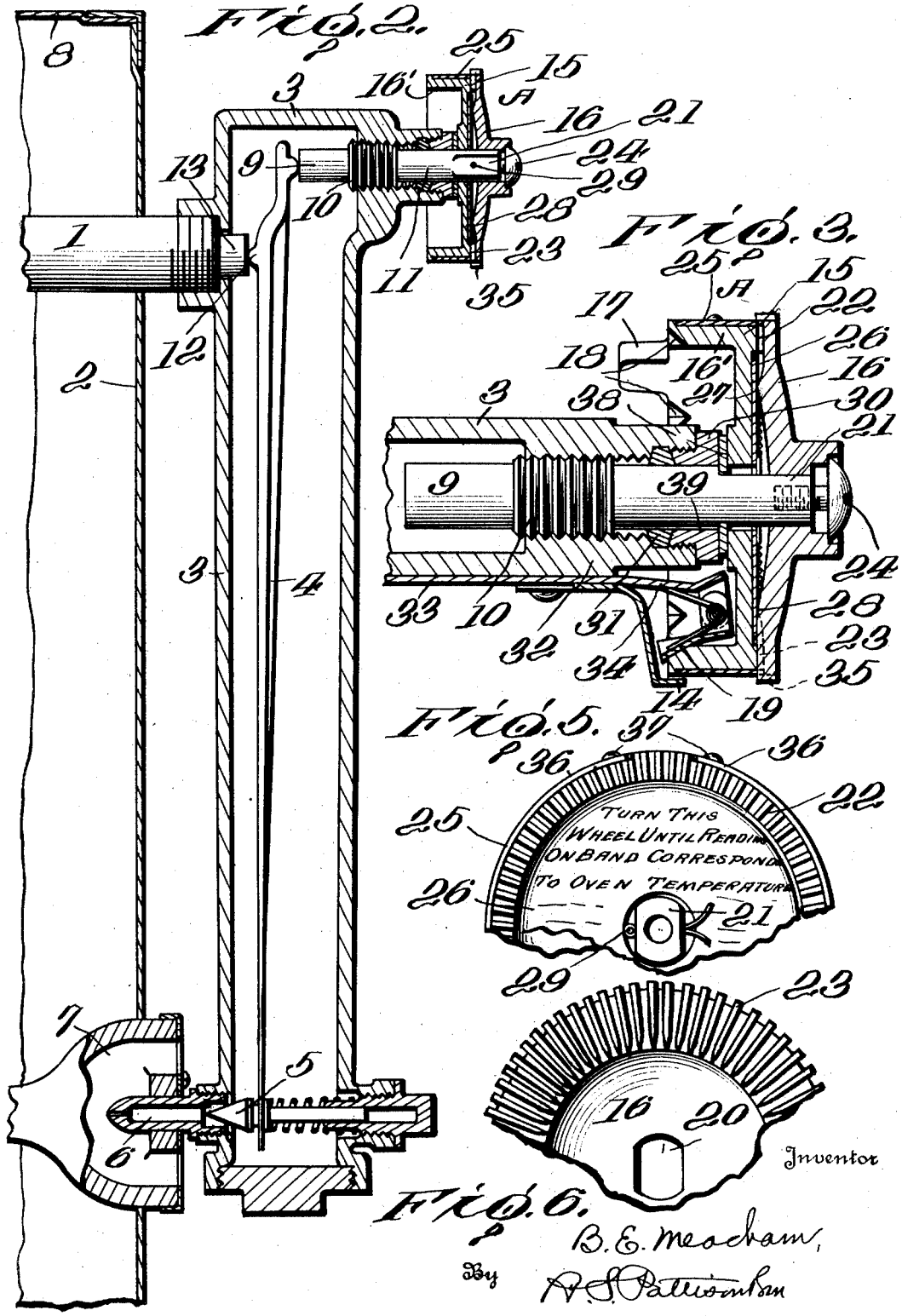

1,656,010

UNITED STATES PATENT OFFICE.

BENJAMIN E. MEACHAM, OF LORAIN, OHIO, ASSIGNOR TO AMERICAN STOVE COMPANY, OF ST. LOUIS, MISSOURI, A CORPORATION OF NEW JERSEY.

OVEN-HEAT REGULATOR.

Application filed October 23, 1925. Serial No. 64,395.

This invention relates to improvements in oven heat regulators, and is particularly intended for use with that type of heat regulator illustrated in my Patent No. 1,236,335, dated August 7th, 1917, though it may be used with other types of heat regulators.

It is understood by those skilled in the art of oven heat regulators, that the main object is to maintain the heat in the oven at a predetermined degree, the degree of heat being regulatable by the operator according to the necessary heat required for cooking different materials.

The primary object of the present invention is to so construct the regulator wheel of the heat regulator that it can be readily, quickly and accurately adjusted, not only by the manufacturer, but by persons not skilled in adjusting heat regulators.

The present improvement, whereby the adjustment of the regulator can be quickly and accurately made, is of advantage to the manufacturer, and is of particular advantage in the hands of the jobbers who are handling stoves that are provided with oven heat regulators.

The present improvement consists in making the regulating wheel of two parts, one part being connected to move with the regulating element and the other part freely movable thereon, but interlocking with the first-mentioned part, whereby in making an adjustment it is only necessary to move one part in respect to the other, and lock the parts in the moved position.

Another improvement is to have the two parts of the wheel provided with locking means which represent a certain number of degrees, say, for instance, five degrees, whereby the regulator can be adjusted readily within five degrees, as will be particularly described hereinafter.

Further objects of the invention will appear from the following description:

In the accompanying drawings—

Figure 1 is a perspective view of an oven heat regulator with my present improvement applied thereto.

Fig. 2 is a vertical sectional view of Fig. 1.

Fig. 3 is an enlarged horizontal sectional view through the regulating wheel of Fig. 1.

Fig. 4 is a side elevation looking at the inner part of the regulating wheel.

Fig. 5 is a view looking from the outer face of the inner part of the wheel.

Fig. 6 is a view looking at the inner side of the outer part of the wheel.

In illustrating the application of the present improvement, I have selected that type of oven regulator shown in my aforesaid patent, which type of regulator comprises a thermostatic member 1, projecting to the outer side of the wall 2 of the oven. In this type of regulator is provided a vertical housing 3, with which the fuel pipe, (not shown) is suitably in communication, whereby the fuel is fed to the inner side of the said housing 3. The fuel may be fed to the upper end of the housing as in my said patent, or it may be fed to any other part of the housing. Located within the housing 3 is a vertically arranged lever 4, the said lever 4 being adapted to control a fuel valve 5 that in turn controls the passage of fuel to a suitable nipple 6, that is in communication with a manifold 7 in which the gas is mixed with a suitable quantity of air and fed to a burner (not shown) within the oven 8. Also in this type of heat regulator is provided a revolvable member 9, which is provided with suitable screw-threads 10 that engage with the housing, the outer end 11 of the member 9 passing outside of the housing, as shown, and carries my improved regulator wheel which will be presently described in detail. The lever 4, near its upper end, as at 12, engages the inner end 13 of the thermostatic member 1, whereby the lower end of the lever is moved by the expansion and contraction of the thermostatic member. The operation of these described members is fully set forth in my said patent, and being understood by those skilled in the art, a further detailed description is believed unnecessary to the understanding of my present improvement in regulating wheels.

The type of wheel shown in my said patent is composed of metal, whereas the wheel in my present improvement consists of red bakelite, which is known by its trade-name. This material has several advantages, among which two will be mentioned. The first is that it does not become hot from the heat of the oven as does the metal wheel of my said patent, which makes the wheel comfortable to handle for regulating the heater, and secondly, a red wheel is produced which is a trade-mark of the assignee, the American Stove Company, of St. Louis, Missouri, of my present application, and of my said patent, which makes the wheel of uniform and lasting color.

It is well-known by those skilled in the art that the regulating wheel is provided with dial indications, while the housing is provided with a pointer 14, whereby the regulator is adjustable to the desired degree of heat.

The present improvement consists in making the wheel A of an inner part 15 and an outer part 16, both parts being applied to that portion of the outer part 11 that extends beyond the housing.

The inner part 15 of the wheel A is preferably made approximately cup-shaped, which provides an inwardly extending flange 16′, the said flange having a stop finger 17 and the inner edge of the flange 16′ provided with a suitable number of notches. These notches 18 are engaged by a spring actuated catch 19, for the purpose of engaging the inner edge of the part 16′ for holding the wheel in the adjusted position. The inner part 15 turns freely on the extended ends of the revolvable member 9, while the outer part 16 has an oblong opening 20 that engages with an angular portion 21 of the said member 9, whereby the member 9 and the outer part 16 are locked and revolve together.

The inner member 15 is provided with a circle of notches 22, with which a circle of notches 23 on the outer member 16 engage, thus locking the members 15 and 16 against relative rotation. Each one of these notches represents approximately an adjustment of the member 9, to cause the thermostat 1 to regulate the heat in the oven that number of degrees. A screw 24 has its head engaging the outer member 16, as shown, and passes into the extremity 21 of the revolvable member 9. By loosening the screw 24 sufficiently to cause the notches 22 and 23 to disengage, the inner member may be rotated freely on the member 9, and free of the outer member 16.

Therefore, the above described construction makes the adjustment of the regulator readily accomplished by one not skilled in adjusting heat regulators. The adjustment is accomplished as follows:

For the purpose of describing this adjustment, it will be assumed, as previously stated, that the adjustment of the inner part 15 in respect to the outer part 16, one notch effects the degree of heat to the extent of five degrees. The regulator being adjusted at the factory is working correctly, but should it, for any reason, become inaccurate, its inaccuracy may be located by a jobber handling the stoves. In making this adjustment, the jobber would turn the wheel A so that 300° on the dial 25 would be opposite the pointer 14. If the oven then is heated above the 300°, for instance 310°, then by loosening the screw 24 and turning the inner part 15 clockwise two notches and turning the screw up again, and now turning the wheel back so that 300° is opposite the pointer 14, then the thermostat will be adjusted so that 300° of heat will generate in the oven. If the degree of heat is lower than the 300°, for instance, 10°, then the inner member 15 would be adjusted in a direction contrary to clockwise which would increase the heat 10°, thus making the thermostatic control correct. By reason of the notches representing a certain definite degree, then the device can be quickly and intelligently adjusted by those unskilled in adjusting thermostatic heaters as well as by a skilled person.

It will be readily understood that the notches may be made of a size to represent any degree of heat, but I find it in practice sufficient to have them represent 5°, which will enable the device to be quickly adjusted for generating the desired heat for cooking.

For the purpose of indicating to anyone not skilled in adjusting this device, I provide the device with a paper disc 26, that is located in a cavity 27 formed in the inner member 15, and the member 16 made to be provided with a projection 28 for engaging the paper disc. This paper disc is placed on the projecting end 21 of the revolvable member 9 and is secured therein in any desired manner, but it is here shown as secured by a cotter pin 29, which passes through the end 21. This disc will have on it suitable directions, such for instance as the following:

"Turn this wheel until reading on band corresponds to oven temperature. Replace outer disc and tighten hub screw."

Anyone following the directions can readily adjust the device to cause it to maintain the desired heat in the oven by effecting the adjustments of the two parts 15 and 16 of wheel A.

For the purpose of making the revolving member 9 gas-tight, where it passes through the housing 3, there is preferably provided a screw-nut 30, that comprises a packing 31, thus constituting a stuffing-box. This revolvable member 9 is provided with suitable screw-threads 10, and by the rotation of it forces the member 9 in and out thereby adjusting the lever 4 for regulating the flow of gas to the oven burner (not shown) as is fully set forth in my aforesaid patent.

In the construction here shown, a metal plate 33 is screwed to the top of the housing 3, and this plate bears in practice the name of the heat regulator, together with notations of patents, and this member 33 is extended beyond the housing as at 34, and carries the spring actuated device 19 that engages the inner periphery 16 of the inner part of the wheel A.

For assisting in turning the wheel A, the outer part 16 of the wheel is roughened as at 35, which is grasped by the fingers of the operator for effecting its adjustment.

The band or dial 25 is preferably formed of metal and has on it the notations as to the degrees of heat and other notations, and has its ends 36 fastened to the part 16 by means of suitable rivets 37.

The inner part 15 of the wheel A is, in fact, clamped by the part 16, against a washer 38, that abuts against a shoulder, formed on the revolvable member 9. By means of this construction the screw 24 firmly clamps the inner parts of the wheel tight on the member, 9, whereby they move as a single movement when the adjustment has been accomplished.

By means of the described improvement, the adjustment of the regulator wheel is very easily made even by a person not skilled in making such adjustment, as well as being convenient for the manufacturer, and the wheel being made, it is cheap to construct and its color permanent, while at the same time the heat of the oven is not conveyed to the wheel.

I have described a construction of my present invention in detail, but I wish it understood that modifications and changes may be made therein so long as they are within a fair interpretation of the scope of the appended claims.

Having thus described my invention, what I claim and desire to secure by Letters Patent is:

1. A thermostatic regulator comprising a rotating revolvable rod and a two-part wheel applied to the rod having its inner end cooperating with a thermostatically operated member, the inner part secured to the rod, the outer end of the rod and the outer part having central openings to prevent relative rotation, the end of the rod having a screw opening, the outer surface of the inner member provided with projections substantially throughout its surface and the inner surface of the outer member provided with engaging projections, and the screw passing through the opening in the outer member into the said opening in the rod, whereby the parts operate as described.

2. A thermostatic controlling member comprising a revolvable shaft having its inner end cooperating with a thermostatically operated member, a two-part wheel, the inner part applied to the shaft against endwise movement but permitting relative rotary movement, the inner part having projections on its outer side, the outer member having a central opening engaging the shaft to prevent relative rotation, said outer member having projections on its inner surface engaging said projections of the inner member, and a screw passing through the opening of the outer member whereby the screw may be loosened and the rod revolved by the outer member independently of the inner member and when the screw is tightened the projections permanently lock the parts of the wheel against relative movement.

3. A thermostatic controlling member comprising a revolvable rod having its inner end cooperating with a thermostatically operated member, a controlling wheel made up of an inner and an outer part, the inner part having its inner side cup-shaped and its inner surface provided with notches, means for locking the inner portion on the rod against endwise movement but permitting a free relative rotated movement, said inner member having notches on its outer side, and a disk shaped outer member having notches on its inner side adapted to engage the notches of the inner member, the outer member having an opening receiving the end of the said revolvable rod, the end of the rod and said opening shaped to prevent relative rotation, and a screw passing through the opening of the outer member into the end of the rod, whereby the loosening of the said screw will permit the rod to be turned by the outer portion independently of the inner part of the wheel, and when the screw is tightened the said projections will permanently engage for the purpose described.

In testimony whereof I hereunto affix my signature.

BENJAMIN E. MEACHAM.